United States Patent [19]

Brown et al.

[11] 4,439,948
[45] Apr. 3, 1984

[54] AGRICULTURAL SPRAYING APPARATUS AND METHOD

[75] Inventors: William P. Brown, Ozark; Jerrell W. Harden, Banks, both of Ala.

[73] Assignee: Brown Manufacturing Company, Ozark, Ala.

[21] Appl. No.: 345,758

[22] Filed: Feb. 4, 1982

[51] Int. Cl.³ .............................................. A01M 21/00
[52] U.S. Cl. ........................................ 47/1.7; 239/159
[58] Field of Search ................... 47/1.7, 1.44; 239/288, 239/159, 172, 170

[56] References Cited

U.S. PATENT DOCUMENTS

| | | | |
|---|---|---|---|
| 1,188,131 | 6/1916 | Agee | 47/1.7 X |
| 1,348,038 | 7/1920 | Neumeyer | 47/1.7 |
| 1,433,856 | 10/1922 | Smith | 47/1.44 X |
| 1,733,883 | 10/1929 | Jaecks | 47/1.7 |
| 2,369,154 | 2/1945 | McLemore | 47/1.44 |
| 3,016,653 | 1/1962 | Gardner | 47/1.7 |
| 3,237,346 | 3/1966 | Watts | 47/1.7 |
| 3,294,324 | 12/1966 | Skaptason | 47/1.7 |
| 3,341,970 | 9/1967 | Bailey | 47/1.7 |
| 3,445,961 | 5/1969 | Elsworth | 47/1.7 |
| 3,599,866 | 8/1971 | Bolton | 47/1.7 X |
| 3,986,298 | 10/1976 | Ablett et al. | 47/1.7 |

FOREIGN PATENT DOCUMENTS 38061  10/1927  Denmark ........................... 47/1.7

*Primary Examiner*—Robert E. Bagwill
*Attorney, Agent, or Firm*—Saidman, Sterne & Kessler

[57] ABSTRACT

A post directed crop spraying apparatus and related method, comprises a pair of opposed substantially vertically extending hood members coupled to a main mounting means. Spray nozzle means are coupled to the main mounting means and disposed between the hood members for spraying liquid material toward the ground between and under the hood members to cross row centers at the base of plants being sprayed. Knockdown bar means are coupled to the main mounting means and extend substantially transversely between the hood members for contacting and for pushing down on weeds during operation of the apparatus. The knockdown bar means are located sufficiently close to the nozzle means to permit the nozzle means to spray liquid material onto the weeds from the bases to the tips thereof and to permit liquid material to be applied in a substantially uniform pattern to the soil around the plant bases.

11 Claims, 3 Drawing Figures

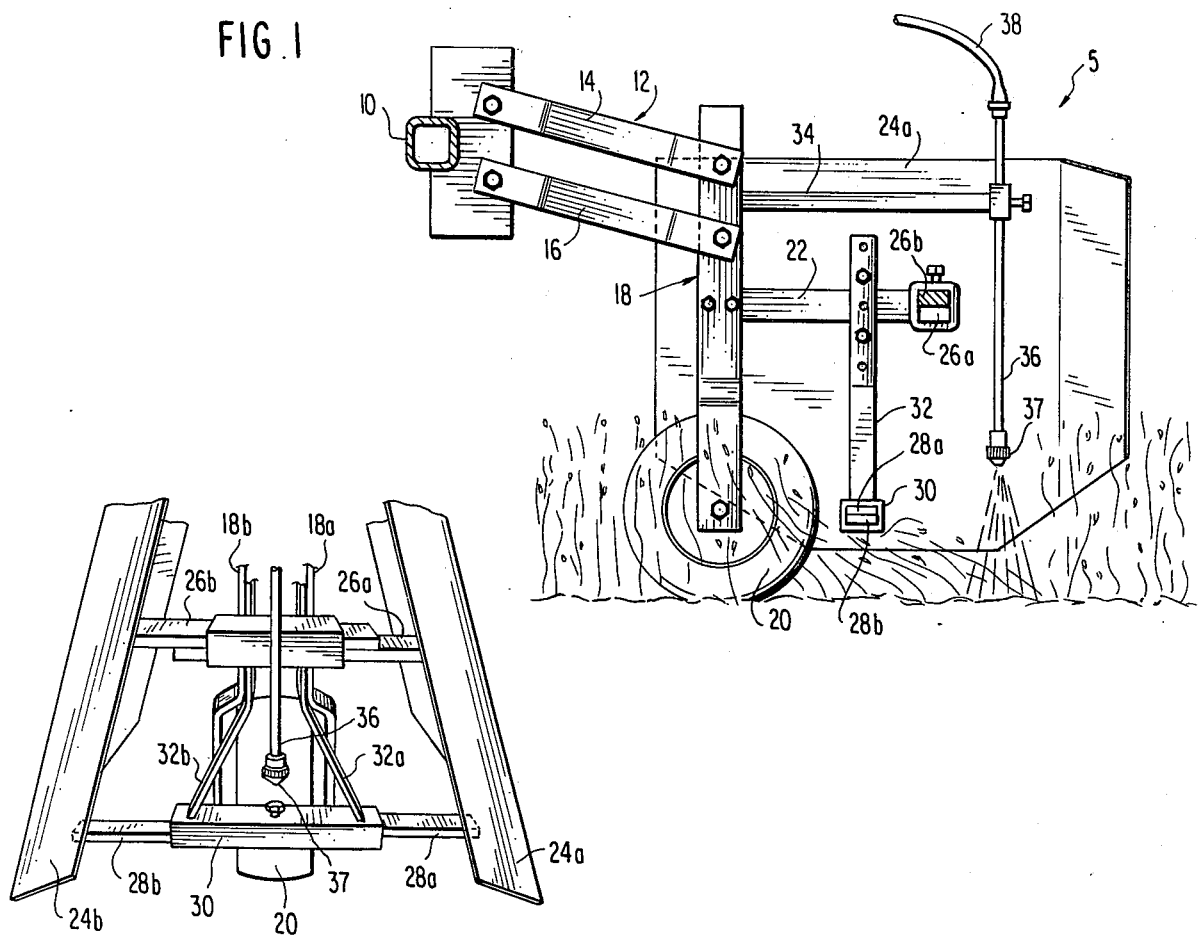
FIG. 1
FIG. 3
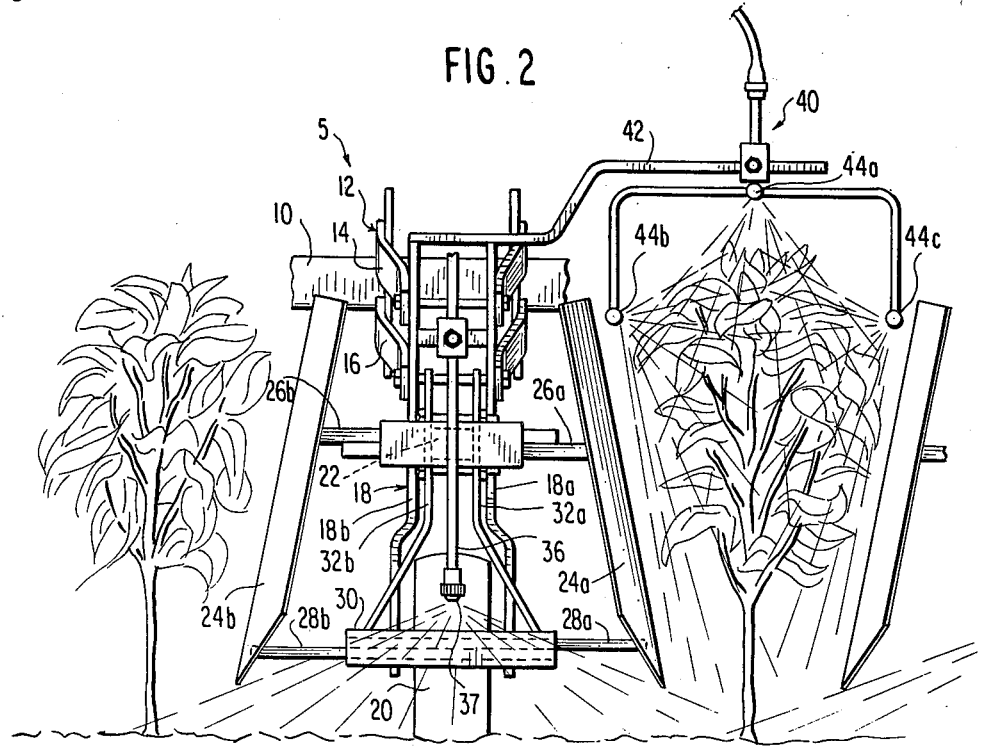
FIG. 2

AGRICULTURAL SPRAYING APPARATUS AND METHOD

BACKGROUND OF THE INVENTION

This invention is directed to an improved agricultural spraying apparatus and method. More particularly, the invention is directed to an improved post directed sprayer which can be used in conventional and no-tillage crop growing environments.

The present invention is directed to a post directed sprayer for applying agricultural chemicals, such as herbicides, insecticides and fungicides, in the field after a crop has been planted and is growing. Post directed sprayers are used to apply chemicals, such as herbicides, into a growing crop that is infested with problem weeds and grasses that cannot be controlled economically, if at all, by broadcast spraying herbicides over the top of the crop. Many weeds and grasses cannot be controlled by broadcast spraying techniques after the crop is up and growing. Chemicals which would control the growth of the weeds and grasses would also kill the crop if applied by the broadcast spraying technique. Those chemicals which may be available to give the desired control without causing crop injury are cost prohibitive. Post directed sprayers make it possible to apply harsh chemicals that would otherwise kill the crop and give excellent weed control efficiently and economically.

Post directed spraying has its own set of problems. For example, the spray nozzle must be placed between the crop rows and close to the ground, approximately 6-14 inches. When this is done, the success of post directed sprayers is very limited due to the fact that the problem weeds and grasses are usually standing up high enough to interrupt the spray pattern. Pest control thus becomes very erratic.

Another problem with post directed sprayers is that if the sprayer pressure is too high or the wind is blowing, chemical droplets will drift out of the prescribed area onto the crop plants, thus causing injury and death to the crop.

The improved post directed sprayer described herein incorporates solutions to the above-described problems. Chemical droplet drift is obviated by placing hoods or fenders on each side of the spraying nozzle, next to the crop row. The hoods lift the limbs and leaves of the plant up and push them toward the row, thus removing essentially all plant extensions from the path of the spray droplets.

A knock down bar assembly is placed in front of the spray nozzle and is adjustable upward and downward, forward and rear so that the weeds and grasses can be held down while the chemical is applied uniformly to the ground and from the base to the tip of the weeds and grasses. By doing this, excellent uniform control is obtained at a nominal cost; thus the highest crop yields are made possible.

Also a post sprayer assembly may be mounted to the apparatus that will allow the application of chemicals that are gentle to the crop right over and on the crop itself, or the application of an insecticide or fungicide to the crop row. As a general rule, the chemicals that will be applied to the crop row with the post sprayer assembly are very expensive and are cost prohibitive when applied with a broadcast sprayer. Therefore, the post sprayer assembly makes these chemicals more affordable by spraying only the narrow band of the row.

SUMMARY OF THE INVENTION

The present invention comprises a crop spraying apparatus and method in which spray nozzle means are coupled to a main mounting means for mounting the apparatus to a motive source, such as a tractor, and are adapted to be located between crop rows in the row middles of a field during operation of the spraying apparatus for spraying liquid material in and around the row middles and bases of plants being sprayed; and knockdown bar means are coupled to the mounting means and extend across at least a substantial portion of the row middles during operation of the spraying apparatus for contacting and for pushing down on weeds in the row middles. The knockdown bar means are located sufficiently close to the nozzle means to permit the nozzle means to spray liquid material onto the weeds from the bases to the tips thereof and to permit liquid material to be applied in a substantailly uniform pattern to the soil around the crop bases.

Additionally, and preferably, a pair of opposed substantially vertically extending hood members are coupled to the main mounting means. The spray nozzle means are disposed between the hood members for spraying liquid material toward the ground between and under the hood members to cross row centers at the base of plants being sprayed. The knockdown bar means extend substantially transversely between the hood members.

Another feature of this invention resides in a method of spraying crops in a field, comprising the steps of pulling a spraying apparatus, having first nozzle means located between crop rows in the row middles of the field, and having second nozzle means comprising a plurality of nozzles located above and adjacent the crop rows, through a field; and substantially simultaneously spraying liquid materials through the first and second nozzle means to substantially simultaneously apply liquid materials to the crops, crop bases, ground surrounding the crop bases and between the crop rows in a single pass through said field.

BRIEF DESCRIPTION OF THE DRAWING

FIG. 1 shows a side view of the spraying apparatus of this invention.

FIG. 2 shows an end view of the spraying apparatus looking forward.

FIG. 3 shows details of the knowkdown bar assembly in relation to the spray nozzle and hoods.

DESCRIPTION OF THE PREFERRED EMBODIMENT

A preferred embodiment of the improved spraying apparatus of this invention will be described with reference to the appended drawings which show one "row" of the spraying apparatus. It is noted that, as manufactured, the apparatus is used in multiple rows, usually consisting of from three to thirteen units. Since the apparatus traverses the row "middles", that is the space between crop rows, a complete apparatus employs one more unit than the number of rows being worked. Thus, a two-row sprayer will have three spraying units; a twelve-row sprayer will have thirteen units.

FIG. 1 is a side view of one spraying unit, generally designated 5, (with a hood removed). The spraying apparatus comprises a tool bar 10 to which is mounted the several spraying units. Each spraying unit 5 is preferably and advantageously mounted to the tool bar 10 through a flexible attachment linkage 12, comprising, for example, a pair of parallel members 14, 16, pivotally mounted at one end to the tool bar assembly 10. The other ends of linkage members 14, 16 are pivotally mounted to a main sprayer frame 18.

As shown in FIG. 2, the main frame 18 preferably comprises at least a pair of frame members 18a, 18b secured to each other and expanding at the lower portion to form a yoke for mounting a gauge wheel 20. The gauge wheel 20 rides on the soil surface during operation.

A main mounting beam 22 is secured at one end to the frame 18 and extends rearwardly therefrom. A pair of laterally spaced apart hoods 24a, 24b are mounted to adjustable hood mounting members 26a, 26b which in turn are mounted to the main mounting beam 22. Hood mounting members 26 are laterally adjustably mounted to the mounting beam 22; hoods 24 are mounted to members 26 for tilt and height adjustment. Thus, the hoods 24 are adjustable to accommodate different types of operating conditions, including crop size, row width, etc.

A knockdown bar assembly includes knockdown bars 28a, 28b mounted in overlapping relationship in a hollow or tubular horizontal mounting member 30. Member 30 is in turn supported at the lower end of a vertical knockdown bar mounting means 32, the other end portion of which is secured to the main mounting beam 22 for both longitudinal and vertical adjustment. In the preferred embodiment, as shown, the vertical mounting means 32 comprises a pair of mounting members 32a, 32b, the lower ends of which extend outwardly in a Y formation securing the horizontal mounting member 30. The upper portions of members 32a, 32b have a plurality of bolt holes formed therein for height adjustment and to clamp the opposed members 32a, 32b to the main mounting beam 22.

A nozzle mounting beam 34 is also secured at one end to the main frame 18. A nozzle assembly 36 having a nozzle head 37 at its lower end is mounted to the rear end portion of beam 34 to be adjustable in height relative to the soil surface. The vertical adjustability of the nozzle head 37 permits a spray to be directed in a particular desired pattern. Thus, in a higher position relative to the ground, the spray pattern may be relatively wide, extending across the row middle under the foilage of the crop plants on either side of the row middle, onto the bases of the crop plants, and even across the crop row itself (as shown in FIG. 2). In a relatively lower position, on the other hand, the spray pattern from nozzle 37 would generally be narrower, extending only across the row middle and under the crop plant foilage in the crop rows on either side of the row middle toward but not as far as the bases of the crop plants. Finally, a supply hose 38 connects a chemical supply tank, usually mounted on a tractor, to the nozzle assembly 36.

The spraying apparatus of the invention may also include a post sprayer assembly 40. This comprises a post sprayer assembly mounting bar 42; only one such mounting bar 42 is shown, although it is contemplated that a second post sprayer assembly 40 may be mounted to the directed sprayer unit 5 and extend over crops on the opposite side from the assembly shown. A plurality of post sprayer nozzles 44 are mounted to the bar 42 for lateral and height adjustment. Generally, three such nozzles, designated 44a, 44b and 44c, respectively, are used for optimum spraying results.

As noted earlier in this disclosure, the use of post directed sprayers may be limited due to the fact that weeds and grasses are often standing up high enough to interrupt the spray pattern, thereby causing pest control to be very erratic. This problem has been essentially solved in the present invention by the use of the knockdown bars 28. The knockdown bars are placed in front of the spray nozzle 36 and are adjustable up and down, forward and rearward, and laterally, so that weeds and grasses can be held down while the chemical is applied uniformly to the ground through the nozzle 36 and from the base to the tip of the weeds and grasses. This technique produces uniform spraying control and nominal cost and results in excellent pest control and high crop yields. The knockdown bars are preferably and advantageously located sufficiently close to the nozzle 36 and at sufficient height relative to the nozzle 36 (preferably below the nozzle) to obtain a substantially uninterrupted chemical application pattern on the ground (for residual effect) and at the same time to apply the chemical from the base to the tip of the pest to produce a contact kill of the pest.

In operation, the flexible attachment linkage 12 enables each row unit to float independently of other row units over obstructions and contoured land. Therefore, the spray nozzle and the knockdown bars maintain a definite and accurate height so that the spray pattern is uniform. The gauge wheel 20 controls the floatation of the row unit, causing the attachment linkage to flex as it rides over obstructions and the contour of the land. The hoods (or fenders) 24 lift the crop limbs, leaves and extensions, and move them inward toward the row and out of the spray path. Another purpose for the hood is to prevent the atomized spray droplets from drifting onto the crop but settle to the ground, thus allowing no injury to the crop.

The knockdown bars 28 push the weeds and grasses over so that the spray nozzle that is located just to the rear may spray the ground with an uninterrupted pattern; by pushing the weeds and grasses over, the spray nozzle 36 applies chemicals to them from the base to the tip. The spray nozzle 36 (for post directed application) functions to apply the chemical to the ground in a pattern that may extend just beyond the row center that is on each side of the nozzle. By having the pattern of each nozzle extend beyond the row center, the total spray pattern for the whole machine is such that the individual spray patterns are overlapping in the row. By doing this, pest control is achieved not only between the rows but also in the row itself.

Finally, the post sprayer assembly 40 sprays the crop row itself (with herbicides, insecticides and fungicides) in a narrow band when extra protection is needed. Naturally only a chemical that is gentle to the crop is applied with this attachment.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced herein.

What is claimed is:

1. A crop spraying apparatus, comprising:

main mounting means for mounting the apparatus to a motive source;

spray nozzle means coupled to said main mounting means and adapted to be disposed in the row middle between two adjacent crop rows of a field during operation of the spraying apparatus for spraying liquid material in and around the row middle and bases of plants being sprayed; and knock down means coupled to said mounting means to be spaced above the ground and to extend substantially across said row middle between but not including said adjacent crop rows during operation of the spraying apparatus for contacting weeds during operation of said apparatus and for pushing down on said weeds in said row middle, said knockdown means being located sufficiently close to said nozzle means to permit said nozzle means to spray said liquid material onto said weeds from the bases to the tips thereof and to permit said liquid material to be applied in a substantially uniform pattern to the soil and around the crop bases.

2. A crop spraying apparatus according to claim 1, further comprising:

a pair of opposed substantially vertically extending hood members coupled to said main mounting means and spaced from each other a distance sufficient to permit said apparatus to travel along said row middle between said two adjacent crop rows with said hood members disposed between said adjacent crop rows;

wherein said spray nozzle means is disposed between said hood members for spraying liquid material toward the ground between and under said hood members to cross the row centers of said crop rows at the base of plants being sprayed; and wherein said knockdown means comprises a knockdown bar extending substantially transversely across said row middle substantially to and between said hood members and ahead of said spray nozzle means.

3. A post directed spraying method for spraying crops in a field, comprising the steps of:

pulling a spraying apparatus, having a nozzle means disposed in the row middle between two adjacent crop rows of the field, and knockdown means spaced above the ground and disposed adjacent said nozzle means and extending across at least a substantial portion of said row middle between but not including adjacent crop rows;

engaging weeds in said row middle with said knockdown means and holding said weeds down with said knockdown means; and spraying a liquid material from said nozzle means onto said held-down weeds from the bases to the tips thereof and toward said crops above said held-down weeds to permit application of said sprayed liquid in a substantially uniform pattern around the crop bases.

4. A post directed spraying method for spraying crops in a field, comprising the steps of:

pulling a spraying apparatus along a row middle between two adjacent crop rows, said apparatus having a pair of opposed crop protecting hoods spaced from each other across a substantial portion of the width of the row middle between said two adjacent crop rows, nozzle means located between the hoods, and knockdown bar means spaced above the ground and disposed adjacent the nozzle means and extending substantially transversely across said row middle substantially to and between the hoods;

engaging weeds in said row middle with said knockdown bar means and holding said weeds down but above the ground with said bar means; and spraying a liquid material from said nozzle means between and under said hoods onto said held-down weeds from the bases to the tops thereof and toward said crops above said held-down weeds to permit application of said sprayed liquid in a substantially uniform pattern around the crop bases.

5. A crop spraying apparatus for controlled spraying of crops and weeds in a single pass along a row middle between two adjacent crop rows while substantially minimizing crop damage from the sprayed material, comprising:

main mounting means for mounting the apparatus to a motive source;

first spray nozzle means adjustably coupled to said main mounting means for substantially vertical movement relative to the ground between a first position, at which liquid material sprayed through said first nozzle means is directed substantially only toward and across said row middle, under the foliage of crop plants in said crop row, onto the bases of said crop plants, and across said crop row beyond said bases, and a second position lower than said first position, at which said sprayed liquid material is directed substantially only toward and across said row middle, under said crop foliage and substantially close to but not onto said crop bases or across said crop row; and second spray nozzle means coupled to said main mounting means and disposed above and laterally of said first spray nozzle means for spraying liquid material substantially only downwardly onto and through said crop foliage substantially concurrently with the spraying of liquid material through said first spray nozzle means.

6. A crop spraying apparatus according to claims 5, further comprising knockdown means coupled to said mounting means to be spaced above the ground and to extend substantially across said row middle between but not including said adjacent crop rows during operation of the spraying apparatus for contacting weeds during operation of said apparatus and for pushing down on said weeds in said row middle, said knockdown means being located sufficiently close to said first spray nozzle means to permit said first nozzle means to spray said liquid material onto said weeds from the bases to the tips thereof and to permit said liquid material to be applied in a substantially uniform pattern to the soil and around the crop bases.

7. A crop spraying apparatus according to claim 6, further comprising:

a pair of opposed substantially vertically extending hood members coupled to said main mounting means and spaced from each other a distance sufficient to permit said apparatus to travel along said row middle between said two adjacent crop rows with said hood members disposed between said adjacent crop rows; wherein said first spray nozzle means is disposed between said hood members for spraying liquid material toward the ground between and under said hood members; and said knockdown means comprises a knockdown bar extending substantially transversely across said row middle substantially to and between said hood members and ahead of said first spray nozzle means.

8. A crop spraying apparatus according to claim 5, further comprising: a pair of opposed substantially vertically extending hood members coupled to said main mounting means and spaced from each other a distance sufficient to permit said apparatus to travel along said row middle between said two adjacent crop rows with said hood members disposed between said adjacent crop rows; wherein said first spray nozzle means is disposed between said hood members for spraying liquid material toward the ground between and under said hood members.

9. A method for controlled spraying of crops and weeds in a single pass along a row middle between two adjacent rows of crop plants while substantially minimizing damage to the crop from the sprayed material, utilizing a crop spraying apparatus having first spray nozzle means for spraying liquid material substantially only under crop foliage and second spray nozzle means disposed above and laterally of the first spray nozzle means for spraying liquid material substantially only down and through said crop foliage, said method comprising the steps of:

vertically adjusting said first nozzle means to one of at least two positions relative to the ground in which the first position is higher than the second position;

pulling said spraying apparatus along said row middle between said adjacent rows of crop plants;

spraying liquid material through said first nozzle means such that, in said first position, liquid material is directed substantially only toward and across said row middle, under the foliage of said crop plants, onto the bases of said crop plants, and across said crop row beyond said bases, and, in said second position, liquid material is directed substantially only toward and across said row middle, under said crop plant foliage, and substantially close to but not onto said crop plant bases or across said crop rows; and spraying liquid material through said second nozzle means substantially only downwardly and through said crop plant foliage substantially concurrently with the spraying of liquid material through said first nozzle means.

10. A post directed spraying method for spraying crops in a field according to claim 9, in which the spraying apparatus further includes knockdown means spaced above the ground and disposed adjacent said first spray nozzle means and extending across at least a substantial portion of said row middle between but not including said adjacent crop rows, said method comprising the further steps of:

engaging weeds in said row middle with said knockdown means and holding said weeds down with said knockdown means; and spraying a liquid material from said first nozzle means onto said held-down weeds from the bases to the tips thereof and toward said crops above said held-down weeds to permit application of said sprayed liquid in a substantially uniform pattern onto said weeds and around the crop bases.

11. A post directed spraying method for spraying crops in a field according to claim 9, in which the spraying apparatus further includes a pair of crop protecting hoods, spaced from each other across a substantial portion of the width of the row middle between said two adjacent crop rows, and knockdown bar means spaced above the ground and disposed adjacent the first spray nozzle means and extending substantially transversely across said row middle substantially to and between the hoods, said method comprising the further steps of:

engaging weeds in said row middle with said knockdown bar means and holding said weeds down but above the ground with said bar means; and spraying a liquid material from said first nozzle means between and under said hoods onto said held-down weeds from the bases to the tips thereof and toward said crops above said held-down weeds to permit application of said sprayed liquid in a substantially uniform pattern onto said weeds and around the crop bases.

* * * * *